US010268645B2

(12) United States Patent
Vaitheeswaran et al.

(10) Patent No.: US 10,268,645 B2
(45) Date of Patent: Apr. 23, 2019

(54) IN-DATABASE PROVISIONING OF DATA

(71) Applicant: SAP SE, Walldorf (DE)

(72) Inventors: Ganesh Vaitheeswaran, Bangalore (IN); Rahul Kumar Jha, Bangalore (IN); Suraj Pai Airody, Bangalore (IN); Anup Kumar Rai, Bangalore (IN); Arindam Bhattacharjee, Bangalore (IN)

(73) Assignee: SAP SE, Walldorf (DE)

( * ) Notice: Subject to any disclaimer, the term of this patent is extended or adjusted under 35 U.S.C. 154(b) by 815 days.

(21) Appl. No.: 13/856,441

(22) Filed: Apr. 4, 2013

(65) Prior Publication Data
US 2014/0304263 A1   Oct. 9, 2014

(51) Int. Cl.
*G06F 16/00* (2019.01)
*G06F 16/28* (2019.01)

(52) U.S. Cl.
CPC .................................. *G06F 16/285* (2019.01)

(58) Field of Classification Search
CPC .................... G06F 17/30289; G06F 16/285
USPC ......................... 707/737, 722, 792
See application file for complete search history.

(56) References Cited

U.S. PATENT DOCUMENTS

| 9,043,344    | B1 * | 5/2015  | Chen     | G06F 16/258 707/756 |
| 2012/0046937 | A1 * | 2/2012  | Ocke     | G06F 17/243 704/9 |
| 2013/0194171 | A1 * | 8/2013  | Ocke     | G06F 16/901 345/156 |
| 2013/0290300 | A1 * | 10/2013 | Chen     | G06F 16/217 707/722 |
| 2014/0095547 | A1 * | 4/2014  | Guo      | G06F 3/0649 707/792 |
| 2014/0247267 | A1 * | 9/2014  | Kumar Kn | G06T 11/206 345/440 |

* cited by examiner

*Primary Examiner* — Chelcie L Daye
(74) *Attorney, Agent, or Firm* — Fish & Richardson P.C.

(57) ABSTRACT

A user uploads date sets through a client to a database. The data sets are provisioned in the database for in-database searching. The data sets are evaluated and classifications for the columns of the tables that include the data set are detected. Columns content may be classified into different analysis types, aggregation types, formats, categories, hierarchies, etc. Metadata is generated based on the evaluation of the data sets. A schema is used to store the metadata that describes the detected classification of the columns. The schema is stored in the database and is used when a search in the database is performed.

20 Claims, 12 Drawing Sheets

Table Name:Resort_Sales

| Country 705 | Resort 706 | Year 707 | Month 708 | Sales Person 709 | Revenue 710 | Number of Guests 711 |
|---|---|---|---|---|---|---|
| France | French Riviera | FY2004 | Aug | Fischer | 7200 | 4 |
| France | French Riviera | FY2005 | Dec | Galagers | 11640 | 6 |
| France | French Riviera | FY2006 | Feb | Ishimoto | 8260 | 4 |
| US | Bahamas Beach | FY2004 | Apr | Fischer | 10976 | 4 |
| US | Bahamas Beach | FY2004 | Sep | Galagers | 11872 | 9 |
| US | Bahamas Beach | FY2006 | Dec | Ishimoto | 7200 | 5 |

FIG. 7

DATASET_MASTER table: For Resort_Sales table

| ROW ID | UUID | SCHEMA_NAME | TABLE_NAME | DISPLAY_NAME | DATASET_TYPE | IS_UPLOADED | PROVISIONED TIME | STATUS |
|---|---|---|---|---|---|---|---|---|
| 1 | 4FD7FF4B53B533EEE10000000A358198 | PARJNAA 810 | Resort_Sales 820 | Resort_Sales | TABLE | 1 | 2012-06-13 | 2 |

DATASET_TO_COLUMN_MAPPING table: For Resort_Sales table

| ROW ID | DATAMASTER_MASTER_ROW_ID | COLUMN_MASTER_ROW_ID |
|---|---|---|
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |

FIG. 8A

COLUMN_MASTER table: For Resort_Sales table

| ROW ID 855 | COL_OID | SCHEMA_NAME 865 | TABLE_NAME 870 | COLUMN_NAME | DATA_TYPE | ANALYSIS_TYPE | DISPLAY_NAME | CATEGORY 875 | FORMAT | AGGR_METHOD |
|---|---|---|---|---|---|---|---|---|---|---|
| 1 | 3647360 | PARJNAA | Resort_Sales | Country | VARCHAR | DIMENSION | Country | GEO | NULL | NULL |
| 2 | 3647361 | PARJNAA | Resort_Sales | Resort | VARCHAR | DIMENSION | Resort | NULL | NULL | NULL |
| 3 | 3647362 | PARJNAA | Resort_Sales | Year | VARCHAR | DIMENSION | Year | TIME | NULL | NULL |
| 4 | 3647363 | PARJNAA | Resort_Sales | Month | VARCHAR | DIMENSION | Month | TIME | NULL | NULL |
| 5 | 3647364 | PARJNAA | Resort_Sales | Sales Person | VARCHAR | DIMENSION | Sales Person | NULL | NULL | NULL |
| 6 | 3647365 | PARJNAA | Resort_Sales | Revenue | INT | MEASURE | Revenue | NULL | NULL | SUM |
| 7 | 3647366 | PARJNAA | Resort_Sales | Number of guests | INT | MEASURE | Number of guests | NULL | NULL | SUM |

HIERARCHY_TABLE

| HIERARCHY_ID | HIERARCHY_TYPE | COLUMN_ID | LEVEL | TABLE_UUID |
|---|---|---|---|---|
| 10 | 1 | 3647362 | 1 | 4FD7FF4B533EEE10000000A358198 |
| 10 | 1 | 3647363 | 2 | 4FD7FF4B533EEE10000000A358198 |

FIG. 8B

IN-DATABASE PROVISIONING OF DATA

BACKGROUND

Enterprise data is generated at a high speed mostly through transactional systems used by the companies. Organizations can gain business value by exploring and analyzing transactional data, which may be generated within the enterprise or other raw data from internal or external sources (e.g. social media). Business entities may utilize database offering to store big data. Data has no meaning if it is only stored and not analyzed. Analysis and searching over stored data may be accomplished by manual identification of the data structures of the database and the underlying backend system. On-the-fly analysis of data stored inside a company database helps business entities achieve a better insight on the stored data and makes future decision faster and more informed. Some search tools replicate the data present in a database into a search index and then perform analysis and search operations on the search index. Processing the data may be performed through a thick middle layer between the database and the search tool. This processing may also include data transfer processes, search index updates, replication of data, etc. The introduction of "in-memory" technology has reduced the time and cost of data processing. According to one embodiment, "in-memory" technology allows working with data stored in random access memory (RAM) for processing without the traditional data retrieval from the database system.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 7 is a table illustrating an exemplary database table to be provisioned for in-database searching.

FIG. 8A is a block diagram illustrating an embodiment of schema tables generated during in-database provisioning of data enabled for searching.

FIG. 8B is a block diagram illustrating an embodiment of schema tables generated during in-database provisioning of data enabled for searching.

DETAILED DESCRIPTION

Embodiments of techniques for in-database provisioning of data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Some business entities may utilize a platform that includes a database to handle big data and to perform real time analysis. Such platform may assist in making use of the computing power and advanced processing features of both the platform as a whole and the incorporated database. To achieve this, in-database processing techniques may be adopted and the processing logic may be moved from the application layer to the database layer to avoid unnecessary movement of data. Also, having the processing logic in the database layer may utilize the advanced parallelization capabilities provided by the database. In one embodiment, database data together with metadata tables for the data may be exposed for searching and analysis purposes. Analytic tools may access and perform data analysis using the metadata tables defined for the database data. For example, a reporting application may be designed to access the database data stored in tables and return desired aspects of the data. A platform having a database that stores big data may seamlessly enable faster access to the data in the database. Then, a user/client may have the power to analyze the data which is in a state for searching.

Figure 1:
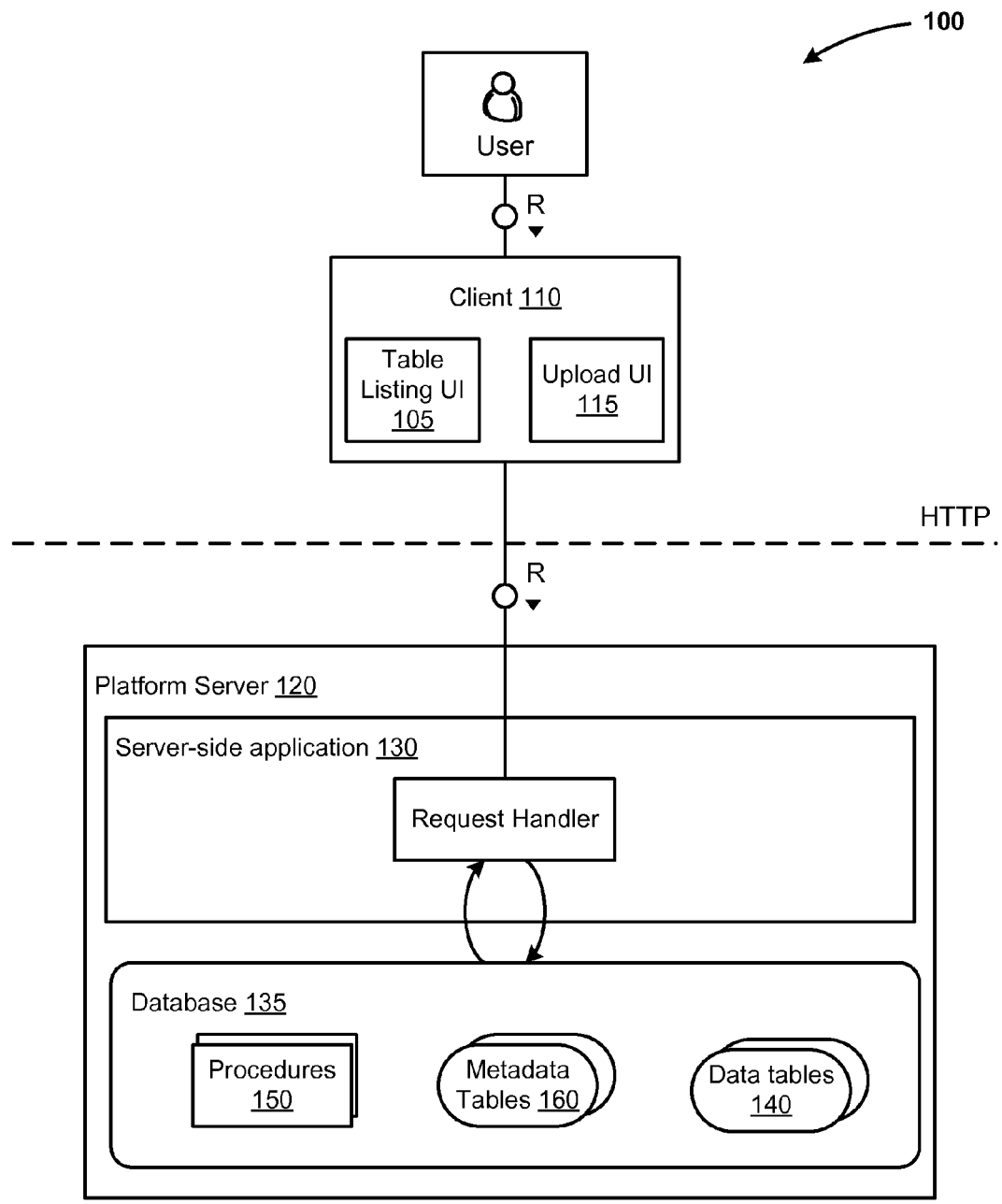
FIG. 1 is a block diagram illustrating an embodiment of a system having a client, a platform server and a database.

FIG. 1 is a block diagram illustrating an embodiment of a system 100 having a client 110, a platform server 120 and a database 135. The client 110 may be a computing device, a desktop application, a web application, etc. The client 110 may include a user interface (UI) for accessing and interacting with the platform server 120, for example, providing input and receiving output from the platform server 120. The client 110 may provide a list of tables in a UI component "Table Listing UI" 105. The client 110 may provide an Upload UI module 115 to allow users to upload data on the platform server 120. In one embodiment, the platform server 120 of the system 100 comprises a server-side application 130 for handling requests, such as search requests. The server-side application 130 may be configured to communicate with the UI of the client 110 and receive and transmit data requests. The communication channel between the client 110 and the server-side application 130 can be based on Hypertext Transfer Protocol (HTTP). In one embodiment, the server-side application 130 may be a JavaScript application. The server-side application 130 may interact with the database 135 to request and receive data. The database 135 may be configured to store data, e.g. big data, in data tables 140.

In one embodiment, the database 135 comprises the data tables 140, procedures 150, and metadata tables 160. The data tables 140 may be column tables used for storing columnar data. Such data may be used for business analytics and other purposes. The metadata tables 160 may implement a schema design for organizing metadata for dividing the artifacts of the database 135 according to purpose oriented criteria. The metadata tables 160 may contain metadata for the data stored in the database 135. In one embodiment, the procedures 150 may be stored procedures written in a database native language. The stored procedures may be defined in SQLScript in the form of a series of SQL statements, for instance. The SQLScript may allow pushing data intensive logic into the database to avoid data copies to the application server and to leverage parallel processing capabilities of the database. For example, the procedures 150 may include procedures for performing metadata searches on the metadata tables 140. In one embodiment, the procedures 150 may be executed in response to a request received from the server-side application 130. The procedures 150 may be executed in the database layer, for example, two or more procedures may be executed simultaneously.

Figure 2:
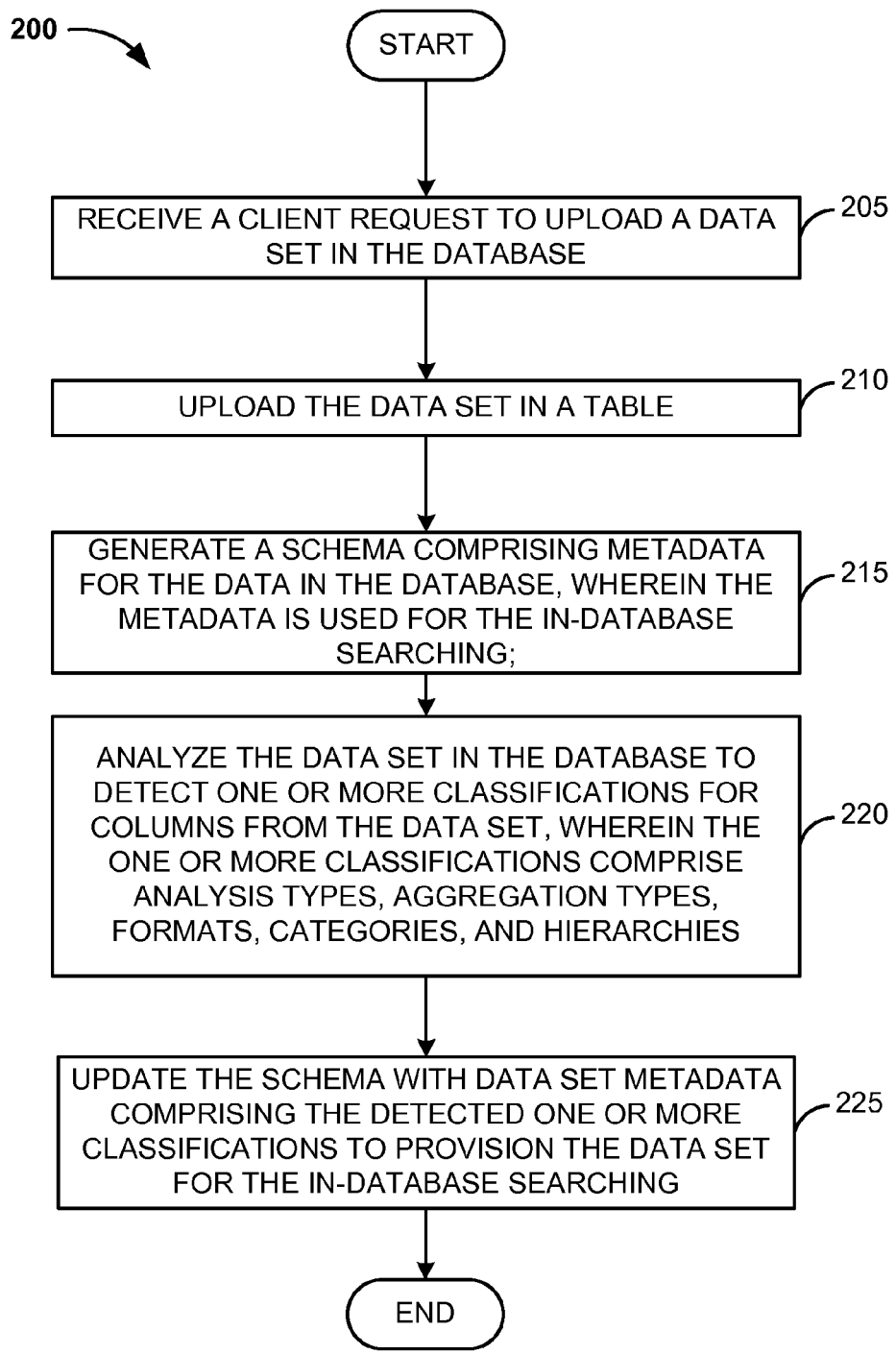
FIG. 2 is a flow diagram illustrating an embodiment of a method for provisioning data in a database for in-database searching.
Figure 5:
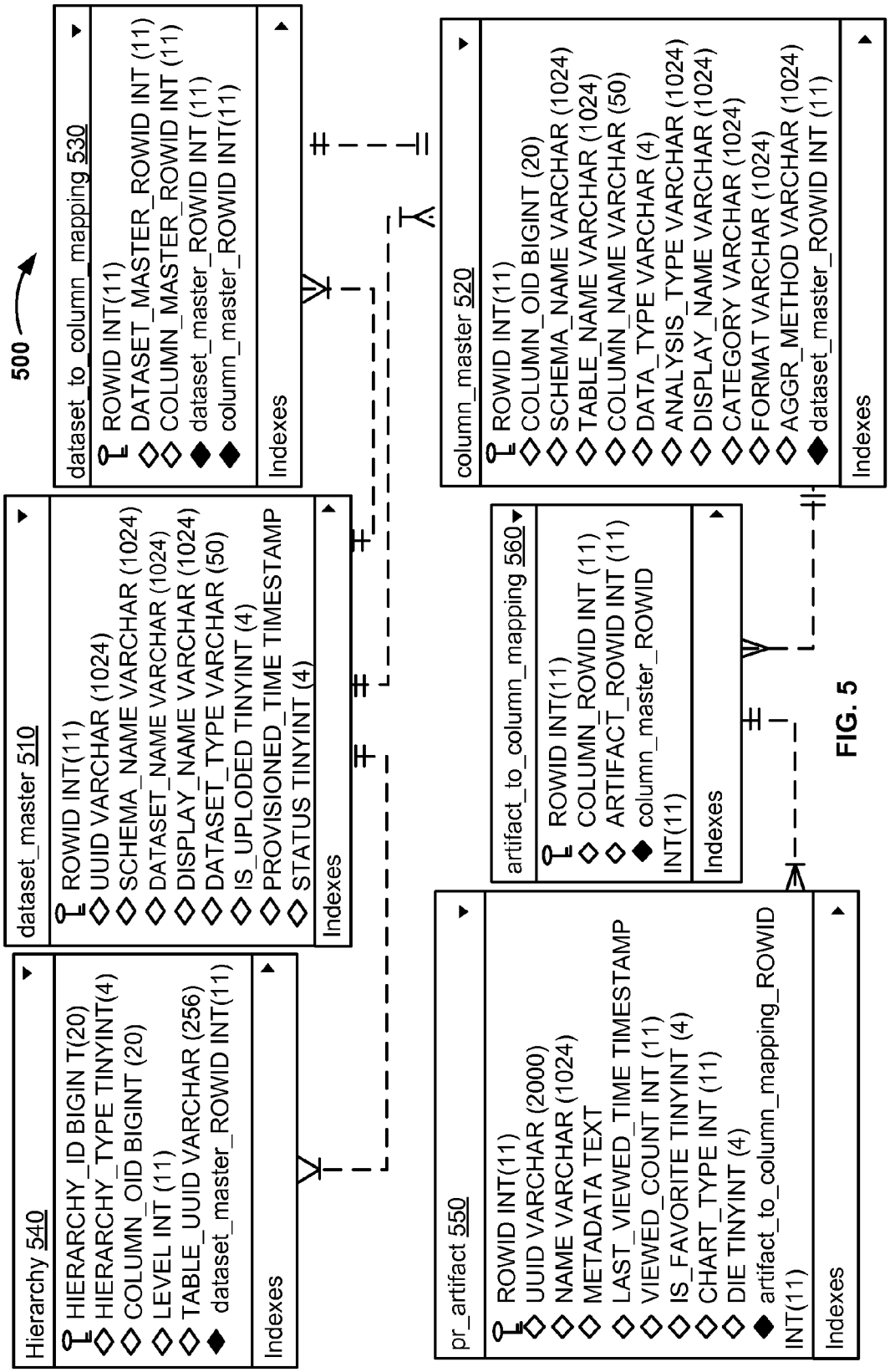
FIG. 5 is a block diagram illustrating an embodiment of a schema that organizes metadata in metadata tables.
Figure 8C:
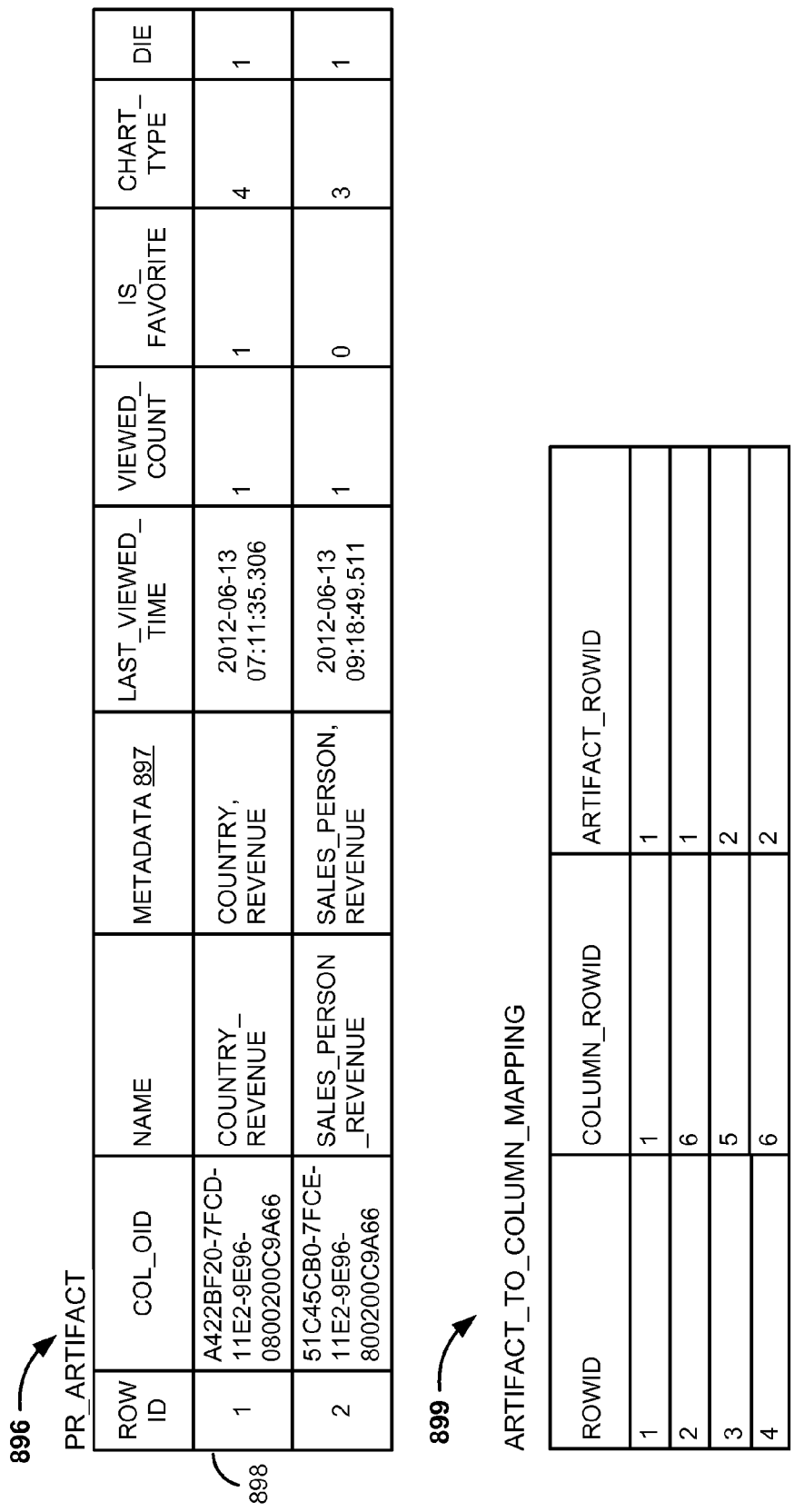
FIG. 8C is a block diagram illustrating an embodiment of schema tables generated during in-database provisioning of data enabled for searching.

FIG. 2 is a flow diagram illustrating an embodiment of a method 200 for provisioning data in a database for in-database searching. At process step 205, a request from a client is received to upload a data set to the database. In one embodiment, the database may be part of a platform server, such as the platform server 120, FIG. 1. For example, the request may be submitted through a UI module on the client's UI, such as the Upload UI module 115, FIG. 1. At process step 210, the requested data set is uploaded to the database, for example, in a data table. The data table may be part of the data tables 140, FIG. 1. A schema is generated at process step 215. The schema is a logical structure that defines a set of tables to logically divide database artifacts into purpose oriented groups. For example, if a user "DEVUSER" uploads a given data set to a database, a schema with a set of related metadata tables is created. The set of related metadata tables may have names prefixed with the user's name—"DEVUSER", to acknowledge that the tables are user specific and no other user is authorized to alter the content of the metadata tables. In one embodiment, the schema may define a number of tables collecting metadata for columns in the data set, e.g., for a hierarchy defined for the values in a given column. Also, the schema may include master metadata for the data set. FIG. 5 describes an embodiment of a schema comprising metadata tables. FIGS. 8A, 8B and 8C present an example of a schema generated for a data table "Resort_Sales" presented in FIG. 7.

At process step 220, the data set is analyzed in order to be provisioned for in-database searching. A detailed analysis for determining the characteristics of the underlying data may be performed. In one embodiment, the processing logic for the analysis may be pushed to reside within the database and may be implemented as a stored procedure. The stored procedure may exploit the computing power of the database and optimize the performance of the analysis as it is a highly data intensive operation. In such a manner, data processing may be performed in the database layer without unnecessary movement of the data from the database layer to an application layer to perform the analysis over the data.

In one embodiment, during the activity of analyzing the data set, different aspects with regards to each of the columns in the data set are taken into account. Classifications such as an analysis type, an aggregation type, a format, a category, a hierarchy, etc., may be determined for each of the columns of the data tables that include the data set. The classifications may correspond to the type of metadata that is stored in the schema generated at process step 215. For example, the analysis type of a column may be classified as a measure or a dimension. If a given column qualifies as a measure, appropriate aggregation type may be determined. For example, the aggregation type may be an aggregation method characterizing the measure, e.g. sum, average, and count. In one embodiment, some date columns may be stored as strings. An auto-detection algorithm may detect the format of a string, e.g. the format of a date may be "dd-mm-yyyy". If a column is classified as a dimension, then the column may be categorized, e.g. in a geographical or time category. In yet another embodiment, a logical correlation for geographical and time categorized columns may be determined and different hierarchies may be defined. The classification of the columns in the data set may be stored as metadata entries in the schema. In one embodiment, the schema defines a table for column metadata that may include the classifications and classification values determined during step 220.

In one embodiment, the analysis of the data set may include evaluation of the data set performed through the execution of a metadata evaluation procedure within the database. Table 1 presents an exemplary pseudo-code for analyzing the data set within the database to determine classifications for the columns in the data set. The presented exemplary pseudo code in Table 1 for a metadata evaluation procedure may be implemented in different database native languages. For example, Structured Query Language (SQL), SQLScript, L programming language, R programming language, etc. The SQLScript language is a collection of extensions to SQL. The extensions may be procedural extensions, which provide imperative constructs executed in the context of the database. The metadata evaluation procedure may be implemented as a stored procedure in the database written in SQLScript. The stored procedure may be written in the form of a series of SQL statements. SQLScript may allow pushing data intensive logic into the database, so that data may be provisioned for searching. The provisioning may be performed in-database.

TABLE 1

Pseudo code for a metadata evaluation procedure

Pseudo-code

| | |
|---|---|
| I. | Read the data from the data set and pass it as input to the metadata evaluation procedure |
| II. | Execute the metadata evaluation procedure |

TABLE 1-continued

Pseudo code for a metadata evaluation procedure
Pseudo-code

1. For each column in a table from the data set
   1.1. Take a sample of distinct values, which can be configured
   1.2. if the sample falls into a numeric category
      1.2.1. Check the range of values in the column
         1.2.1.1. Check if the range may be categorized as Year, quarter, month, day
            1.2.1.1.1. If true, then mark the column as a Time dimension (this means that the column has an analysis type= dimension and a category = Time)
            1.2.1.1.2. If no Time hierarchy is available, then create one, else update the existing Time hierarchy
            1.2.1.1.3. Add the column at appropriate level in the hierarchy
         1.2.1.2. Check if the range falls into an ID category (too many unique values)
            1.2.1.2.1. If true, mark the column as a dimension instead of a measure
         1.2.1.3. If it doesn't fall in any of the above category, update the analysis type for the given column to be a measure.
   1.3. If the sample falls into non-numeric category
      1.3.1. Check if it can categorized as Year, Quarter, Month, Day
         1.3.1.1. If true, mark the column as a Time dimension
         1.3.1.2. If no Time hierarchy is available, then create one, else update the existing one.
      1.3.2. Check if the values into the sample can be categorized into a geographical (GEO) category
         1.3.2.1. If true, then mark the column as a GEO dimension
         1.3.2.2. If no GEO hierarchy is available of the given dataset, create a new GEO hierarchy & add the column at appropriate level
            1.3.2.2.1. If a GEO hierarchy is available, then reuse the existing GEO hierarchy
      1.3.3. Check if it can be categorized into a DATE category
   1.4. If the sample falls into an alpha-numeric category
      1.4.1. Check it year/quarter category,
         1.4.1.1. If true, then Mark the column as a TIME dimension
         1.4.1.2. If no Time hierarchy is available, then create one, else update the existing Time hierarchy.
         1.4.1.3. Add the column at appropriate level in the hierarchy
      1.4.2. Check if the range falls into ID category (too many unique values)
         1.4.2.1. If true, mark the column as a dimension
2. For artifacts which already have the columns marked as a dimension or a measure
   2.1. Read the dimension list
      2.1.1. Check if any dimension has TIME attributes
      2.1.2. Check if any dimension has GEO attributes
   2.2. Read the measure list
   2.3. Check if there is any predefined hierarchy At process step 225, the schema is updated with data set metadata comprising the detected one or more classifications defined during the analyzing step. By generating metadata, the data set is provisioned for in-database searching. The provisioning logic may be implemented and executed in the database that contains the data set. In one embodiment, one may refer to the provisioning process as to an in-database provisioning. Table 2 presents an exemplary pseudo code for updating the schema comprising metadata tables. The updating steps may be implemented in a database native language, such as SQLScript.

TABLE 2 pseudo code for updating the schema with metadata

1. If during the analysis of the data set there is any hierarchy information
   1.1. Update the hierarchy table from the metadata tables for the data set with values for the attributes - hierarchy_id, hierarchy type, column_id, level_no, and table_id.
2. Update the column_master table from the metadata tables for the data set
   2.1. For each column in the a given table
      2.1.1. Add a row in the column_master table with all the analysis information gathered in step 1
      2.1.2. Add entries in a column dataset mapping table
3. Update the table_master table
4. If the analysis is done on an uploaded table, run the alter table command to update the column data type
5. Commit all the changes into the database.

In another embodiment, the process step 220 and 225 may be implemented as one stored procedure that reads data from the data set, evaluates the data to determine classifications for the columns in the data set, and updates the schema with the metadata tables stored for the data set. These steps are executed in the database on the data set, which resides in the database, without any data transferring. Therefore, performance optimization and efficiency are achieved in the process. In one embodiment, the schema may be updated with other details apart from the detected one or more classifications. For example, defining a friendly name of the data set, a friendly name of the schema, a type for the data set, provisioned time, and status of the provisioning. The metadata in the schema may be enriched by the user with specific inferences for the data set. After the analysis step 220, the user may suggest overriding of the metadata that is stored in the metadata tables. A given column may be treated to have an analysis type—measure (during the analysis step 220), however a user may request to override this metadata and replace it with an analysis type—dimension. A user can also specify the appropriate name for the data set and the columns. Changes in the metadata may help during the actual search process.

Figure 3:
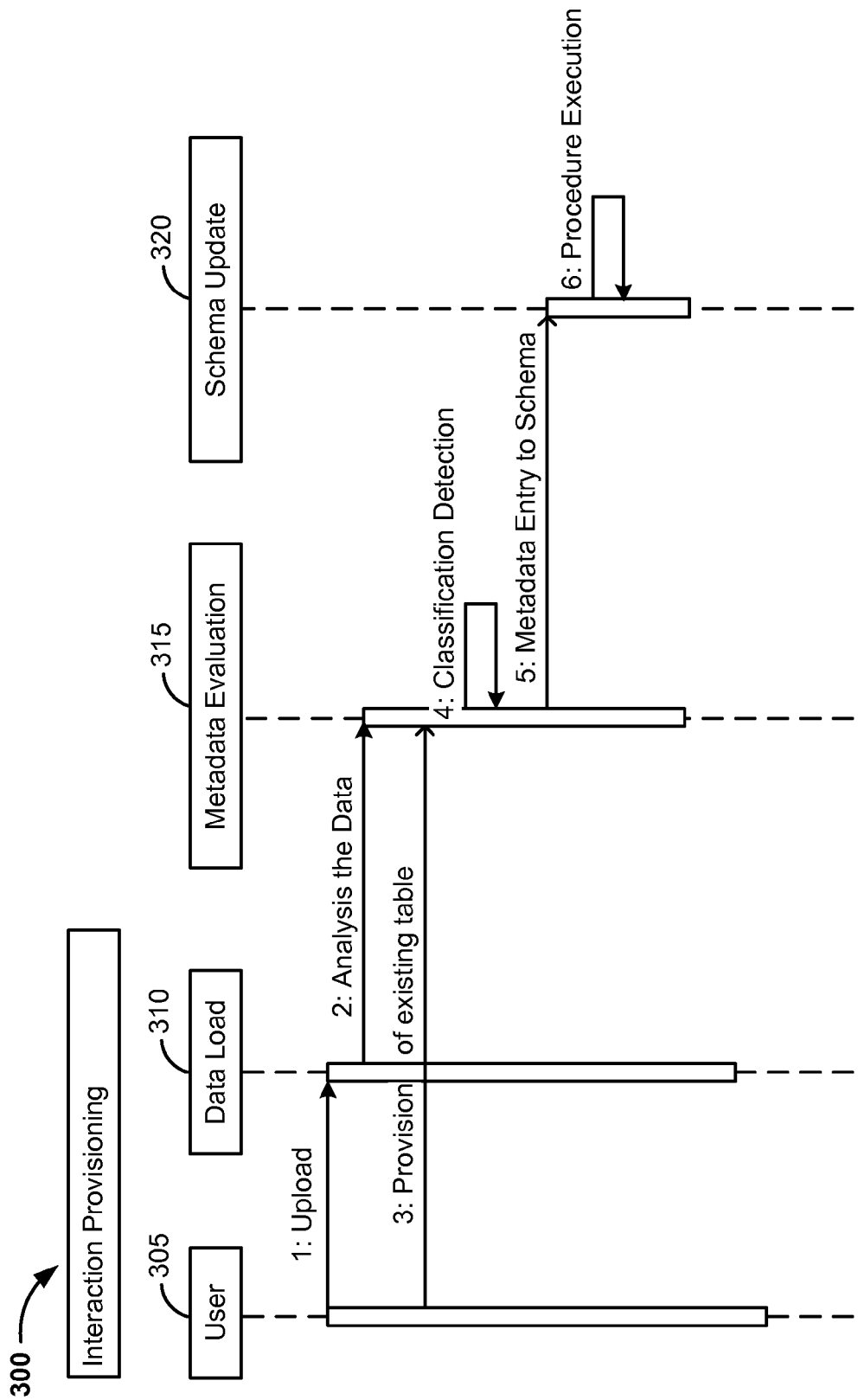
FIG. 3 is a sequence diagram of the embodiment of the method in FIG. 2 for provisioning data in a database for in-database searching.

FIG. 3 is a sequence diagram 300 of the embodiment of the method in FIG. 2 for provisioning data in a database for in-database searching. In one embodiment, a User 305 uses the method 300 to provision data within the database, in order the data to be exposed for in-database searching. For example, the User 305 may send the request to upload a data set from a client application, e.g. a web browser, a desktop application, etc. The uploading is handled by a Data Load 310 module. The Data Load 310 module gets the values from the data set and inserts them into tables in the memory of the database. In one embodiment, the Data Load 310 module may be responsible for staging the data from different source into the database so that complex calculations and analysis can be done over the data by using the computing power of the underlying database. For example, the data may reside in a text or a flat file. The Data Load 310 module passes the tables having the data set to a Metadata Evaluation 315 module, which does the evaluation of the data and detects classification of columns from the tables. In another embodiment, The Data Load 310 module is invoked selectively depending on the type of source data. The Data load 310 module may not be invoked if the User 305 requests to provision data that already resides in the database. In another embodiment, the User 305 requests to provision an existing table with data so that the data is exposed for in-database searching. The request from the User 305 is handled by the Metadata Evaluation 315 module.

The Metadata Evaluation 315 module may internally invoke a metadata evaluation procedure, such as the metadata evaluation procedure described in FIG. 2 with the pseudo code in Table 1. The Metadata Evaluation 315 module performs the detection of classifications of columns from the tables in the database that store the requested data to be provisioned. The result from the evaluation of the data may be one or more classifications of the columns—an analysis type, an aggregation type, a format, a category, a hierarchy, etc. The Metadata Evaluation 315 module transfers the result to be entered as metadata in a schema, such as the schema generated in step 215, FIG. 2. A Schema Update 320 module updates the schema with the metadata according to the received classifications of the columns. The Schema Update 320 module may further create and execute procedures that implement search and analysis logic. Data that is uploaded or requested by the user 305 is provisioned, which means that data is available for exploration and analysis. In one embodiment, the search for data in a database may be performed through triggering already created stored procedures. The process of provisioning assures that the data from the data sets stored on the database is considered during search and analysis activities.

Figure 4:
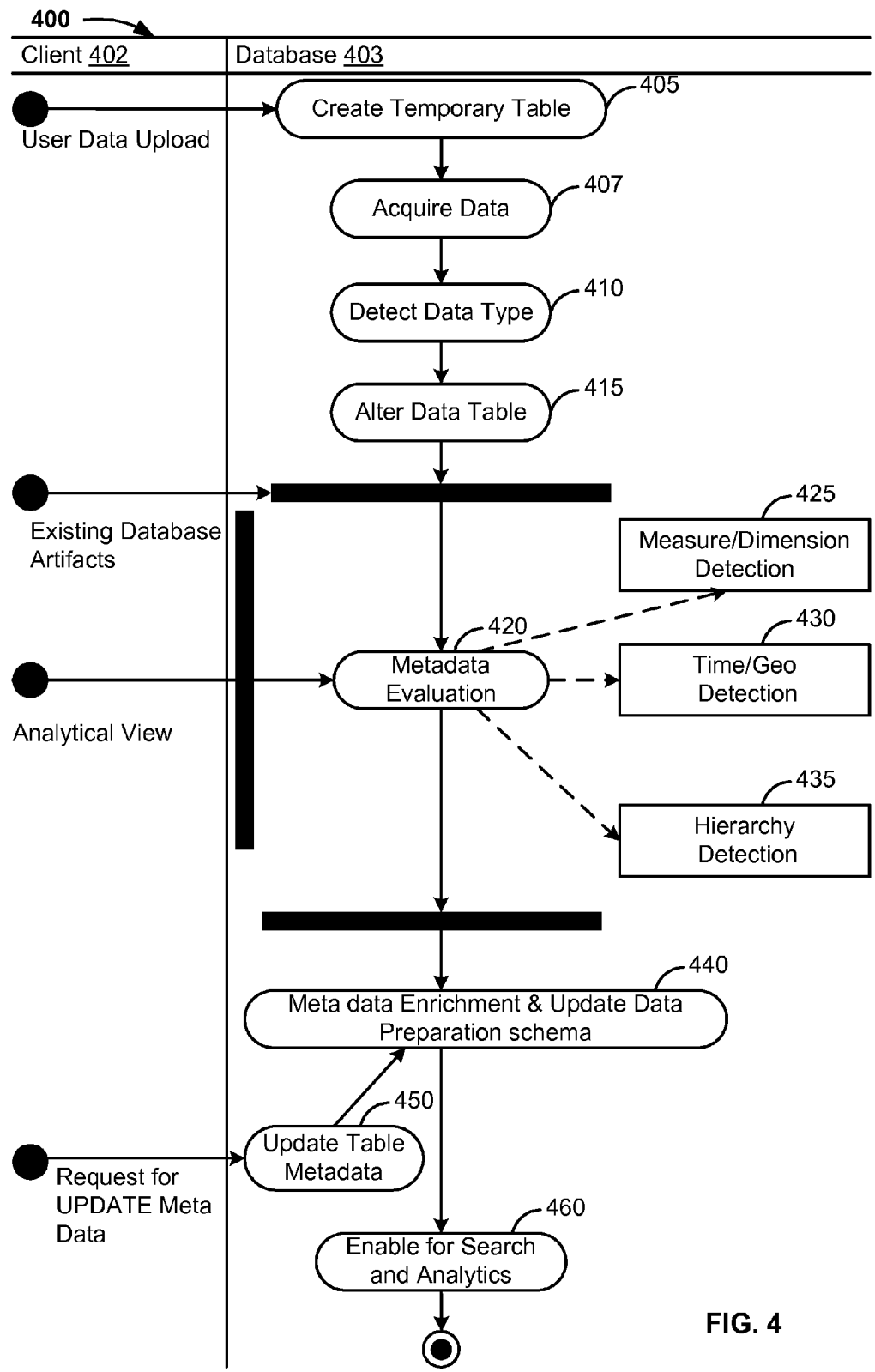
FIG. 4 is a flow diagram illustrating an embodiment of a method for preparing and enabling data for in-database searching.

FIG. 4 is a flow diagram illustrating an embodiment of a method 400 for preparing and enabling data for in-database searching. In one embodiment, a client 402 and a database 403 are communicating during the process of provisioning data in the database 403 for in-database searching. A user may upload data from a data set to the database 403. A temporary table is created at block 405. At block 407, the data set is acquired and the temporary table is populated with the data. At block 410, an evaluation is done to determine the data type for each column of the data set. The determination may be based on selecting random sample data and checking whether the column content is in a string format or in a numeric format. In one embodiment, different approaches to determine the data type of each column may be undertaken. For example, the data values in the columns may be casted to double. If the casting operation throws a conversion error, then the column is not in a numeric format and may be marked as a variable character field type. Otherwise the column is determined to be in a numeric format. In another embodiment, additional tests may be performed to determine appropriate data types for numeric columns. For example, the numeric column data may be checked whether it is a decimal number. If all the values of the column are not decimal numbers, and if all the values lie between −2147483648 and 2147483647, then the data type for the column may be marked as integer. If all the values of the column are not decimal numbers, but do not fall in the interval between −2147483648 and 2147483647, then the data type for the column may be marked as big integer. The metadata stored for all the columns detected with numeric data format may be changed to reflect the different data type of the numeric column.

Table 3 present an exemplary pseudo-code for the process of uploading the data set (steps 405-415, FIG. 4). In one embodiment, the determination of the data type of each column from the uploaded data set may be performed through invoking a stored procedure created in the database. Such a stored procedure may be implemented in different database native languages discussed above. The analysis of the data to determine data types for columns may be performed in-database without extraction of data. Table 4 presents an exemplary data type detecting stored procedure that implements the pseudo code in Table 3 in SQLScript language. In one embodiment, such data type detecting stored procedure may be part of the stored procedures in the database, e.g. Procedures 150 in Database 130, FIG. 1.

TABLE 3

1. User sends an upload request
  1.1. Read the incoming data & create a temporary table with all columns marked as "variable characters"
  1.2. Insert the records from the temporary tables.

TABLE 3-continued

```
1.3.    Determine the data type of each column
1.4.    if a column contain numeric values
   1.4.1.    check whether they are decimal numbers
      1.4.1.1.    if true, then mark the column as Decimal
   1.4.2.    Else
      1.4.2.1.    Check whether the values fall into the range between -
                  2147483648 to 2147483647
         1.4.2.1.1.    If true, then mark as integer
      1.4.2.2.    Else
         1.4.2.2.1.    Mark as BigInt
   1.4.3.    For each column, alter the column type to the appropriate data type
1.5.    Else
   1.5.1.    Mark as varchar (variable character)
```

TABLE 4

```
create procedure PRAJNAA.CALLDETECTANALYSISTYPE(IN schemaName
varchar (2000),IN tableName varchar(2000)) LANGUAGE SQLSCRIPT SQL
SECURITY INVOKER AS
colName varchar(2000);
uQ Double;
rowCount Double;
schema_name varchar(2000);
v_COLUMN_ID BIGINT;
tab_name varchar(2000);
column_name varchar(2000);
analysis_type varchar(2000);
data_type varchar(2000);
aggregation_type varchar(2000);
max_length integer;
min_length integer;
max_value varchar(2000);
min_value varchar(2000);
newColName varchar(2000);
quoteColName varchar(2000);
temp_row_count integer;
CURSOR c_cursor1 FOR
SELECT "COLUMN_NAME","TABLE_NAME","SCHEMA_NAME" FROM
"SYS"."M_CS_COLUMNS" where "SCHEMA_NAME"=:schemaName AND
"TABLE_NAME"=:tableName;
BEGIN
FOR r1 as c_cursor1 DO
    colName:=r1."COLUMN_NAME";
    select replace(:colName,'"','""')into newColName from dummy;
    select replace(:colName,'"','""')into quoteColName from dummy;
    exec 'insert into PRAJNAA.COLUMNCONTENT(select top 1000 distinct
'''||:newColName ||''''||','''||:quoteColName||''','''||:tableName||''''.''||:schemaName||'''
from '''||:schemaName||''''.'''||:tableName||''''|| ' where '''||:newColName||''' is not null
'|| 'order by '''||:newColName ||''')';
    temp = select
"COLVALUE","COLNAME","TABLENAME","SCHEMANAME" from
PRAJNAA.COLUMNCONTENT where "SCHEMANAME"=:schemaName AND
"TABLENAME"=:tableName;
    select count (*) into temp_row_count from :temp;
    if :temp_row_count = 0 then
        min_value :=0;
        max_value :=0;
    Else
        select max (LENGTH ("COLVALUE"))into max_length from
PRAJNAA.COLUMNCONTENT;
        select min (LENGTH ("COLVALUE"))into min_length from
PRAJNAA.COLUMNCONTENT;
        select max ("COLVALUE") into max_value from
PRAJNAA.COLUMNCONTENT where LENGTH ("COLVALUE") = :max_length;
        select min ("COLVALUE") into min_value from
PRAJNAA.COLUMNCONTENT where LENGTH ("COLVALUE") = :min_length;
    end if;
    SELECT "DISTINCT_COUNT"/"COUNT","COUNT" INTO uQ,rowCount
FROM "SYS"."M_CS_COLUMNS" where "SCHEMANAME"=:schemaName AND
TABLE_NAME=:tableName AND COLUMN_NAME=:colName;
    call
PRAJNAA.DETECTANALYSISTYPE(:temp,result,uQ,rowCount,min_value,max_
value,schemaName,tableName,colName);
    delete from PRAJNAA.COLUMNCONTENT where
"SCHEMANAME"=:schemaName AND "TABLENAME"=:tableName;
    SELECT COLUMN_ID_INTO v_COLUMN_ID FROM
"SYS"."TABLE_COLUMNS" WHERE SCHEMA_NAME = :schemaName AND
```

TABLE 4-continued

```
TABLE_NAME = :tableName AND COLUMN_NAME = :colName;
  SELECT "SCHEMA_NAME", "TAB_NAME", "COL_NAME",
"ANALYSIS_TYPE","DATA_TYPE" , TO_BIGINT(v_COLUMN_ID) as
COLUMN_OID FROM :result;
END FOR;
END;
```

After the uploading procedure explained in steps 405-415, the data set is stored in data tables in the database. At process step 420, data in the data tables is analyzed and evaluated to determine classifications for the columns from the data tables and to define metadata to be stored in a schema, such as the schema generated at process step 215, FIG. 2. In one embodiment, during the evaluation of the data, an aggregation type such as "measure" and "dimension" may be detected at process step 425. At process step 430, aggregation type "dimension" may be further divided into two categories—a geographical and a time category. In another embodiment, at process step 430, hierarchies for the different dimensions may be detected for the data in the data tables. The process of analysis of the data, at process step 420, and the detection steps 425, 430, 435, may be performed through invoking a metadata evaluation procedure, such as the metadata evaluation procedure described in FIG. 2. In addition, the analysis steps may be performed by a metadata evaluation module, such as the Metadata Evaluation 315 module, FIG. 3.

At process step 440, the determined classification for the data may be inserted in the form of metadata in the schema comprising metadata tables. Additionally, at process step 450, the metadata that is generated may be enriched with additional details requested by a user. For example, friendly names of the uploaded data set. In another embodiment, the metadata stored at process step 440 may further be enriched with metadata describing additional details for the preparation process of the data, for example, provisioned time, status of provisioning, etc. As a result of the step 440, the schema is populated with metadata for the columns from the data tables. The provisioning of the data in the data tables includes generating the metadata. The metadata is useful during an in-database searching process performed over the data in the database. At process step 460, searching procedures are created in the database to enable the data for searching and analytics. In one embodiment, a third party application may request a search in a Business Intelligence (BI) Infrastructure to analyze the data within the system. The suggested method 400 may be deployed and plugged into different database systems integrated with BI. In such a manner, it may be possible to use the processing capability of the underlying database system to handle search requests received in the database system.

FIG. 5 is a block diagram illustrating an embodiment of a schema 500 that organizes metadata in metadata tables. The schema may be such as the schema including the metadata tables 160 in FIG. 1, the schema generated at process step 215, FIG. 2, the schema used by the Schema Update 320 module in FIG. 3, the schema used in process step 440, FIG. 4, or another. In one embodiment, the schema 500 includes a set of metadata tables—dataset_master 510 metadata table, column_master 520 metadata table, dataset_to_column_mapping 530 metadata table, hierarchy 540 metadata table, pr_artifact 550 metadata table, artifact_to_column_mapping 560 metadata table. The dataset_master 510 may be a master table, which stores the information about every data set, which is enabled for searching. For each data set provisioned for searching, an entry in this dataset_master 510 metadata table is created that contains the relevant information which may be used during a search. Table 5 presents a list of exemplary attributes (columns) of the dataset_master 510 metadata table.

TABLE 5 dataset_master 510 metadata table

| | |
|---|---|
| ROWID | An auto generated integer number interpreted as a primary key for the table |
| UUID | A unique identity number (ID) for the data set |
| SCHEMA_NAME | The name of the schema that includes metadata for the corresponding data set. |
| DATASET_NAME | The internal name for this data set. It will be set to the table/view name. |
| DISPLAY_NAME | A user specified name for this data set |
| DATASET_TYPE | An enumerated type. |
| IS_UPLOADED | True or false values to determine if this data set was uploaded by this user. |
| PROVISIONED_TIME | The time at which this data set was provisioned. |
| STATUS | Represents the current status of data set. |

Table 6 presents a list of exemplary attributes of the column_master 520 metadata table. The column_master 520 metadata table stores the information about the table columns, e.g. detected classification of the columns such as analysis type, category, format, aggregation method. Additionally, in the column_master 520 metadata table are stored details such as data types, column name, etc. These values are inferred and evaluated during the analysis steps performed over a data set that is provisioned for in-database searching. For example, during the analysis steps explained in process step 220, FIG. 2, performed by the metadata evaluation 315 module in FIG. 3 or the process step 420 in FIG. 4. The analysis steps are not limited to the given examples.

TABLE 6 column_master 520 metadata table

| | |
|---|---|
| ROWID | This is an auto-generated integer ID |
| COLUMN_OID | This is the unique ID for this column within the database. |
| SCHEMA_NAME | The schema, where this column is located. |
| TABLE_NAME | The table/view name where this column is located |
| COLUMN_NAME | The SQL identifier for this column |
| DATA_TYPE | A value from an enumerated (enum) type representing the data type. There is a 1-to-1 mapping with SQL data types. |
| ANALYSIS_TYPE | An integer enum value that defines whether this column is a dimension or a measure. |
| DISPLAY_NAME | An optional value that a user can configure to provide a search-friendly column name if the original name is not search-friendly. |
| CATEGORY | An optional enum value that may be configured by auto-detection algorithms and can be overridden by a user if required. This may contain values representing categories such as GEO and TIME. |

TABLE 6-continued column_master 520 metadata table

| | |
|---|---|
| FORMAT | An optional string that may be configured by auto-detection algorithms and overridden by a user if required. For example, some date columns may be stored as strings. The auto-detection algorithm can detect these cases and detect the format of the date, for example dd-mm-yyyy. |
| AGGR_METHOD | For measures, the aggregation method that is applied.<br>This is an enum value representing the aggregation methods - SUM, AVG and COUNT. |

Table 7 presents a list of exemplary attributes of the dataset_to_column_mapping 530 metadata table. The dataset_to_column_mapping 530 metadata table contains the mapping between dataset_master 510 and column_master 520 metadata tables.

TABLE 7 dataset_to_column_mapping 560 metadata table

| | |
|---|---|
| ROWID | This is an auto-generated integer id |
| DATASET_MASTER_ROWID | Foreign key reference to DATASET_MASTER |
| COLUMN_MASTER_ROWID | Foreign key reference to COLUMN_MASTER |

Table 8 presents a list of exemplary attributes of the hierarchy 540 metadata table. The hierarchy 540 metadata table contains the hierarchy information present in the data table that is provisioned. Hierarchy information can be of any type, for example levels, parent/child relations, etc.

TABLE 8 hierarchy540 metadata table

| | |
|---|---|
| HIERARCHY_ID | A unique ID for hierarchy. |
| HIERARCHY_TYPE | Type of hierarchy which represents Level or Parent Child. |
| COLUMN_OID | The OID of the column. |
| LEVEL | The level of the hierarchy in which it is defined. |
| TABLE_UUID | ID of the table. |

The pr_artifacts 550 metadata table may contain a snapshot of info blocks that are saved by the user when searching in the database. Each info block has a unique UUID and it contains information such as Last View Time, View Count, Is_Favorite etc. Table 9 presents a list of exemplary attributes of the pr_artifacts 550 metadata table.

TABLE 9 pr_artifact 550 metadata table

| | |
|---|---|
| ROWID | An auto-generated integer ID |
| UUID | A standard UUID value that uniquely identifies the infoblock. |
| NAME | A user-friendly name for the infoblock. |
| METADATA | An XML string representing the metadata for the infoblock. Metadata may contain the SQL query defined for the search that resulted in this infoblock. |
| VIEWED_COUNT | The number of times this artifact was viewed by this user. |
| IS_FAVORITE | May be set when a user chooses this infoblock as a favorite. |
| LAST_VIEWED_TIME | The last time when the user accessed this infoblock. |

TABLE 9-continued pr_artifact 550 metadata table

| | |
|---|---|
| CHART_TYPE | The chart type selected by the user. This is an integer enum value set and interpreted by the client. |

The artifact_to_column_mapping 560 metadata table contains many-to-many relationship between the column information and the info blocks that are generated and saved during searches in the database. Table 10 presents a list of exemplary attributes of the artifact_to_column_mapping 560 metadata table.

TABLE 10 artifact_to_column_mapping 560 metadata table

| | |
|---|---|
| ROWID | An auto-generated integer ID |
| ARTIFACT_ID | Foreign key reference to PR_ARTIFACT table |
| COLUMN_ID | Foreign key reference to COLUMN_MASTER table |

Figure 6:
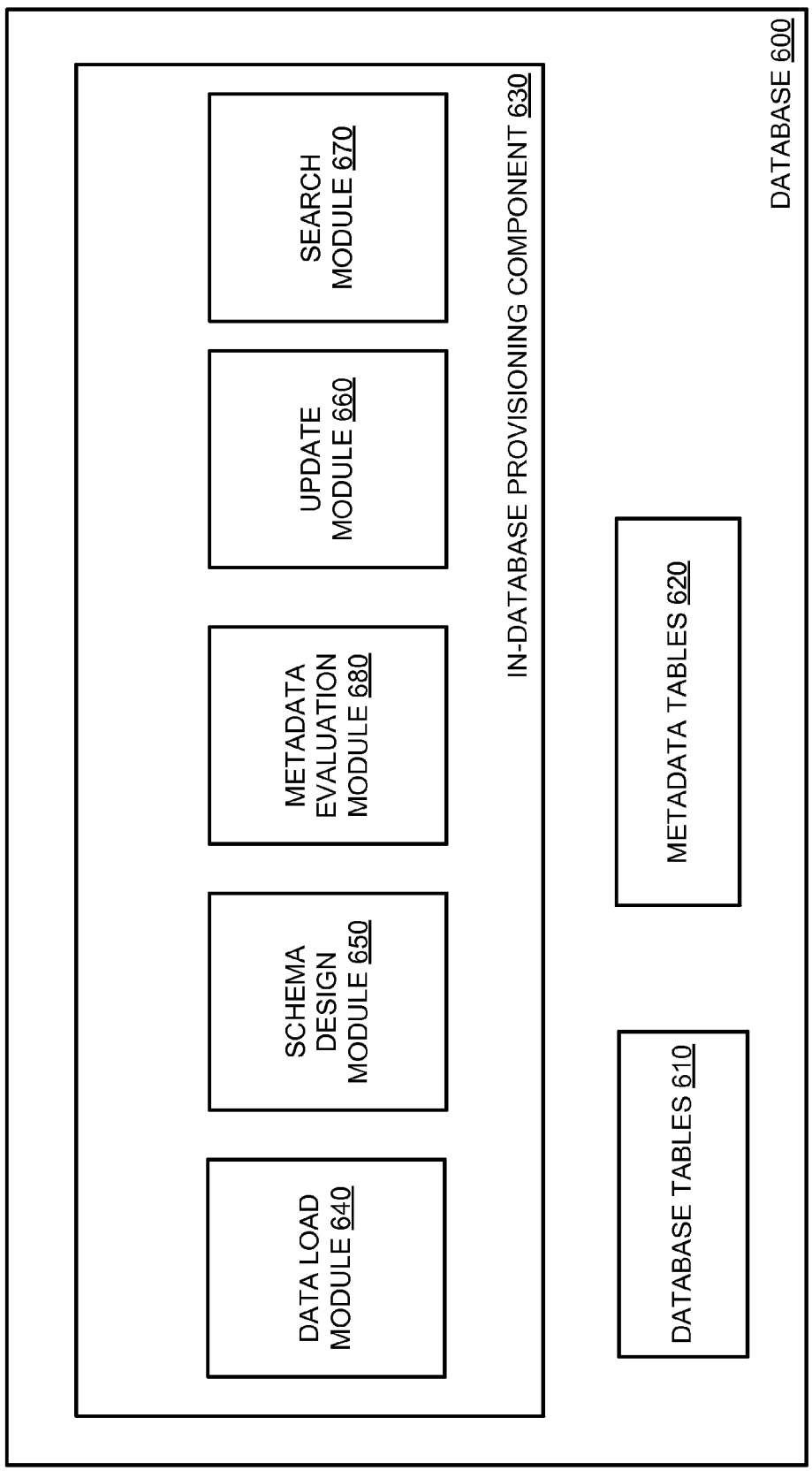
FIG. 6 is a block diagram illustrating an embodiment of a database including data evaluation logic enabled to run in memory within the database.

FIG. 6 is a block diagram illustrating an embodiment of a database 600 including data evaluation logic enabled to run in memory within the database 600. In one embodiment, the database 600 may be such as the database 135 part of the platform server 120. The database 600 may receive requests from a user through a client application. The database 600 may include database tables 610 and metadata tables 620. The database table 610 may include data sets uploaded to the database in form of tables. The metadata tables 620 may be such as the metadata tables 160 in FIG. 1 and may correspond to the schema described in FIG. 5. The metadata tables 620 may store metadata that can be used for performing searches over the data in the database tables 610 that can be accomplished in memory. The database 600 may incorporate an in-database provisioning component 630 that handles the preparation of the data in the database table 610 for in-database searching. The in-database provisioning component 630 includes a data load module 640, a schema design module 650, a metadata evaluation module 680, an update module 660, and a search module 670. In one embodiment, the data load module 640 may be used when receiving a request to upload data to the database 600 in the database tables 610. The request may be received from a client, such as a web application (e.g. web browser), desktop application, etc. The data load module 640 may be in communication with the data tables 610, and the schema design module 650. In one embodiment, the data load module 640 may correspond to the data load 310 module in FIG. 3. The schema design module 650 may be used when generating a schema comprising metadata in metadata tables, such as the metadata tables 620. The schema design module 650 may take care of the organization of the metadata for the provisioned data in the database 600. The metadata evaluation module 680 may be used to analyze the data set that is provisioned. The metadata evaluation module 680 may correspond to the metadata evaluation 315 module in FIG. 3. The metadata evaluation module 680 may be in communication with the data load module 650 and the database tables 610. Data sets that resides in the database tables 610 or data sets that are uploaded through the data load module 650 may be evaluated to detect classifications of the columns from the data set. In one embodiment, the metadata evaluation module 680 may include a metadata evaluation procedure, such as the presented procedure in Table 1. The classifications may comprise analysis types, aggregation types, format, categories, hierarchies, etc. The detected classifications for the analyzed data set may be stored in form of metadata, according to the schema generated in the schema design module 650, stored in metadata tables 620.

The update module 660 may store logic for updating the schema with metadata tables storing metadata that may be used for in-database searching. The update module 660 may correspond to the schema update 320 module in FIG. 3 and the logic presented in the pseudo code in Table 2. The update module 660 may be operable to keep the schema metadata in the metadata tables 620 up to date. The update module 660 may also be operable to optimize the search operations within the database according to user received preferences. The search module 670 may be in communication with the metadata tables 620. The search module 670 may perform in-database searching using stored search procedures to analyze the data in the database 600 according to search criteria. The search procedures that are stored in the search module 670 may be in the form of database stored procedures in a database native language, such as the metadata evaluation procedure described in FIG. 2. The search module 670 may receive and handle third party search requests that specify search criteria. A result may be provided for the received search requests based on the logic for searching implemented in the search procedures stored in the search module 670. The search procedures may be implemented to search into the metadata, and more specifically, the metadata tables 620 in the database 600.

Table 11 presents an exemplary column search procedure for a search based on the names of columns of the data sets stored in the database tables 620 in the database 600. The search procedure is written in SQLScript language. A "column master" table that contains metadata for the columns in the database is searched for the presence of a column. Table 12 presents a column value search procedure that utilizes the stored metadata for the data in the database 600. Using the metadata for searches (as in the exemplary column search procedure and column value search procedure), rather than performing the search against the entire database, optimizes the search process—saves both time and resource consumption. In one embodiment, to get the optimal performance and to achieve parallelization for each of the artifacts (e.g. data sets) in the database 600, a value search procedure for each provisioned artifact is created. If the searched term is a value existing in one of the columns from the data set, then the procedure returns the column ID and the matched value of the term.

TABLE 11

```
CREATE PROCEDURE Schema1.HTMLCLIENT_SEARCH_COLUMN_MASTER(
IN term1 STRING,IN term2 STRING,IN term3 STRING,IN term4 STRING,IN term5
STRING)
LANGUAGE SQLSCRIPT AS searchTerm1 STRING ;searchTerm2
STRING;searchTerm3 STRING;searchTerm4 STRING;searchTerm5 STRING;
BEGIN
if (term1 is not NULL) and (trim (:term1)!= '' ) then
    searchTerm1:= '%' || trim (term1) || '%' ;
select distinct "DISPLAY_NAME" as "matchedTerm","COLUMN_NAME" as
"columnName","TABLE_NAME" as "tableName", "SCHEMA_NAME" as
"schemaName",:term1 as "searchTerm","COLUMN_OID" as "columnId" from
"Schema1"."HTMLCLIENT_COLUMN_MASTER" where LOWER ("DISPLAY_NAME")
like LOWER (:searchTerm1);
end if;
if (term2 is not NULL) and (trim (:term2)!= '') then
    searchTerm2:= '%' || trim (term2) || '%' ;
   select distinct "DISPLAY_NAME" as "matchedTerm","COLUMN_NAME" as
"columnName","TABLE_NAME" as "tableName", "SCHEMA_NAME" as
"schemaName",:term2 as "searchTerm","COLUMN_OID" as "columnId" from
"Schema1"."HTMLCLIENT_COLUMN_MASTER" where LOWER ("DISPLAY_NAME")
like LOWER (:searchTerm2);
end if;
if (term3 is not NULL) and (trim (:term3)!= '') then
    searchTerm3:= '%' || trim (term3) || '%';
   select distinct "DISPLAY_NAME" as "matchedTerm","COLUMN_NAME" as
"columnName","TABLE_NAME" as "tableName", "SCHEMA_NAME" as
"schemaName",:term3 as "searchTerm","COLUMN_OID" as "columnId" from
"Schema1"."HTMLCLIENT_COLUMN_MASTER" where LOWER ("DISPLAY_NAME")
like LOWER (:searchTerm3);
end if ;
if (term4 is not NULL) and (trim (:term4)!= '' ) then
    searchTerm4:= '%' || trim (term4) || '%' ;
   select distinct "DISPLAY_NAME" as "matchedTerm","COLUMN_NAME" as
"columnName","TABLE_NAME" as "tableName", "SCHEMA_NAME" as
"schemaName",:term4 as "searchTerm","COLUMN_OID" as "columnId" from
"Schema1"."HTMLCLIENT_COLUMN_MASTER" where LOWER ("DISPLAY_NAME")
like LOWER (:searchTerm4);
end if;
if (term5 is not NULL) and (trim (:term5)!= '' ) then
searchTerm5:= '%' || trim (term5) || '%';
   select distinct "DISPLAY_NAME" as "matchedTerm","COLUMN_NAME" as
"columnName","TABLE_NAME" as "tableName", "SCHEMA_NAME" as
"schemaName",:term5 as "searchTerm","COLUMN_OID" as "columnId" from
"Schema1"."HTMLCLIENT_COLUMN_MASTER" where LOWER ("DISPLAY NAME")
like LOWER (:searchTerm5);
end if;
end;
```

TABLE 12

```
CREATE PROCEDURE
Schema1.USERSCHEMA_4FE1A1236A00EBAFE10000000A358198_SEARCH
   (IN term1 STRING,IN term2 STRING,IN term3 STRING,IN term4 STRING,IN
term5 STRING)
LANGUAGE SQLSCRIPT AS
searchTerm1 STRING;searchTerm2 STRING;searchTerm3 STRING;searchTerm4
STRING;searchTerm5 STRING;
BEGIN
if (term1 is not NULL) and (trim (:term1)!= '')
then searchTerm1:= '*' || trim (term1) || '*';
SELECT "Category" as "4239877", "Lines" as "4239878", "City" as "4239879", "State"
as "4239880", "Quarter" as "4239881", "Year" as
"4239882",grouping_id("Category","Lines","City","State","Quarter","Year") as
"groupingid" from "USERSCHEMA"."4FE1A1236A00EBAFE10000000A358198" group
by grouping sets LIMIT 10 TEXT_FILTER
:searchTerm1("Category","Lines","City","State","Quarter","Year");
end if ;
if (term2 is not NULL) and (trim (:term2)!= '') then
searchTerm2:= '*' || trim (term2) || '*';
SELECT "Category" as "4239877", "Lines" as "4239878", "City" as "4239879", "State"
as "4239880", "Quarter" as "4239881", "Year" as
"4239882",grouping_id("Category","Lines","City","State","Quarter","Year") as
"groupingid" from "USERSCHEMA"."4FE1A1236A00EBAFE10000000A358198" group
by grouping sets LIMIT 10 TEXT_FILTER
:searchTerm2("Category","Lines","City","State","Quarter","Year");
end if ;
if (term3 is not NULL) and (trim (:term3)!= '')
then searchTerm3:= '*' || trim (term3) || '*';
SELECT "Category" as "4239877", "Lines" as "4239878", "City" as "4239879", "State"
as "4239880", "Quarter" as "4239881", "Year" as
"4239882",grouping_id("Category","Lines","City","State","Quarter","Year") as
"groupingid" from "USERSCHEMA"."4FE1A1236A00EBAFE10000000A358198" group
by grouping sets LIMIT 10 TEXT_FILTER
:searchTerm3("Category","Lines","City","State","Quarter","Year");
end if ;
if (term4 is not NULL) and (trim (:term4)!= '')
then searchTerm4:= '*' || trim (term4) || '*';
SELECT "Category" as "4239877", "Lines" as "4239878", "City" as "4239879", "State"
as "4239880", "Quarter" as "4239881", "Year" as
"4239882",grouping_id("Category","Lines","City","State","Quarter","Year") as
"groupingid" from "USERSCHEMA"."4FE1A1236A00EBAFE10000000A358198" group
by grouping sets LIMIT 10 TEXT_FILTER
:searchTerm4("Category","Lines","City","State","Quarter","Year");
end if ;
if (term5 is not NULL) and (trim (:term5)!= '')
then searchTerm5:= '*' || trim (term5) || '*';
SELECT "Category" as "4239877", "Lines" as "4239878", "City" as "4239879", "State"
as "4239880", "Quarter" as "4239881", "Year" as
"4239882",grouping_id("Category","Lines","City","State","Quarter","Year") as
"groupingid" from "USERSCHEMA"."4FE1A1236A00EBAFE10000000A358198" group
by grouping sets LIMIT 10 TEXT_FILTER
:searchTerm5("Category","Lines","City","State","Quarter","Year");
end if ;
END;
```

FIG. 7 is a table illustrating an exemplary database table 700 to be provisioned for in-database searching. The exemplary database table 700 is a table describing resort sales that contains six rows describing different sales records. Each row represents a set of values (data elements) characterizing a given sale record according to the defined attributes (columns) in the table 700—country 705, resort 706, month 708, sales person 709, revenue 710, and number of guests 711. For example, in row 720, there is a sales record that has the following characteristics stored in the row 720. France was the Country 705 value in the first column, which means that the sale was performed in France, in the "French Riviera" resort, in Fiscal year 2004 (FY2004), in August, the sales person who performed the sale has the name "Fischer", the revenue from the sale was "7200" and the number of guests logged for that sale were 4.

FIGS. 8A, 8B, and 8C are block diagrams illustrating an embodiment of schema tables generated during in-database provisioning of data enabled for searching. The exemplary metadata tables in FIGS. 8A, 8B, and 8C are metadata tables generated for the exemplary database table 700–"Resort_Sales", FIG. 7. Dataset Master table 800 is an exemplary master table corresponding to the master table 510, FIG. 5. The Dataset_Master table 800 contains one record about the schema that stores metadata for the data set stored in the exemplary database table 700—"Resort_Sales", FIG. 7, which is displayed at block 820. The schema name is "PARJNAA", which is displayed at block 810. The dataset_to_column_mapping table 830 is a metadata table defined for the table 700 and displays the mapping between the Database_Master table 800, and a Column_Master table 850 on FIG. 8B.

The dataset_to_column_mapping table 830 corresponds to the dataset_to_column_mapping 530 table in FIG. 5. For example, record 835 in the dataset_to_column_mapping table 830 has a ROW ID equal to 1, and shows that the record with row id=1 in the Column_Master table 850 corresponds to the record with row id=1 in Dataset_Master table 800. The Column_Master table 850 on FIG. 8B corresponds to the column_master 520 table, FIG. 5. Each record in the column_master 850 table has a row id in the column 855 and describes the values stored in each column. For example, record 860 with id=1 corresponds to the country 705 column on FIG. 7. For that column, the metadata that is stored in record 860 includes the schema_name defining the metadata for the table 700—"PARJNAA" in column schema_name 865 on FIG. 8B, the table_name "Resort_Sales" in column 870, etc. In column_master 850 table there is metadata entered based on classification detected for the columns in the data set in table 700—"Resort_Sales". It is determined that the analysis type of the column Country 705 is dimension, and has a category "GEO" (defined in column 875). For the record 860, there is no format determined, and there is no aggregation method detected, as the country 705 column is a geographical dimension column. Record 880 is for the sixth column in table 700—column 710 "Revenue". The column 710 is classified to have an analysis type "measure". For a measure an aggregation method may be determined, and for column 710 the aggregation method is SUM. In one embodiment, columns that include qualitative data may be classified as dimensions, and columns that include quantitative, numeric data may be classified as measures. For example, a value that is a function of one or more dimensions may be classified as a measure.

Hierarchy_table 885 includes metadata for determined hierarchies for columns in the table 700 that gave an aggregation type—dimension. Column 705, 706, 707, 708, and 709 are with aggregation type dimension, as displayed in column_master 850 table. Record 890 and record 891 in column_master table 850 are detected to include values part of a hierarchy. The detection of this hierarchy is stored as metadata in the hierarchy_table 885 as it is stored in two rows—row 892 and 893. The row 892 corresponds to column 707—"Year", and the row 892 corresponds to column 708—"Month". The values in column 707 are detected to be in a higher level in the hierarchy than the values in column 708, and this is presented in column 895 "Level" in the hierarchy_table 885. Year values and month values may be determined to be part of one hierarchy and year is at a higher level—"level 1" than month, which is at level 2.

Pr_artifact table 896 in FIG. 8C represents info blocks that may be stored as metadata for performed user searches in the table 700. In one embodiment, an info block may be a combination of dimensions and measures determined for a particular search query. The first record 898 in the pr_artifact table 896 may be associated with a user entry for a search query, such as "revenue by country", and it has the name "country_revenue" and the combination between the dimension (country) and measure (revenue) is stored in the METADATA 897 column. A search procedure may find that country and revenue match column names in the table 700 "Resort_Sales". The combination—country and revenue, may be displayed as an infoblock to the user. The user can choose to save the infoblock to easily access it later. When a user saves an infoblock, a row is created in pr_artifact table 896. The artifact_to_column_mapping 899 table contains the association between the columns from the table 700, that are relevant for an infoblock (saved in pr_artifact table 989) and the corresponding columns in Column_Master table 850. For example, the record 898 may be mapped to column 705 "Country" and column 710 "Revenue" in table 700. If we need to retrieve metadata about the columns relevant for an infoblock, such as data type or analysis type, we may follow the association in the artifact_to_column_mapping 899 table and retrieve the metadata from Column_Master table 850.

Figure 9:
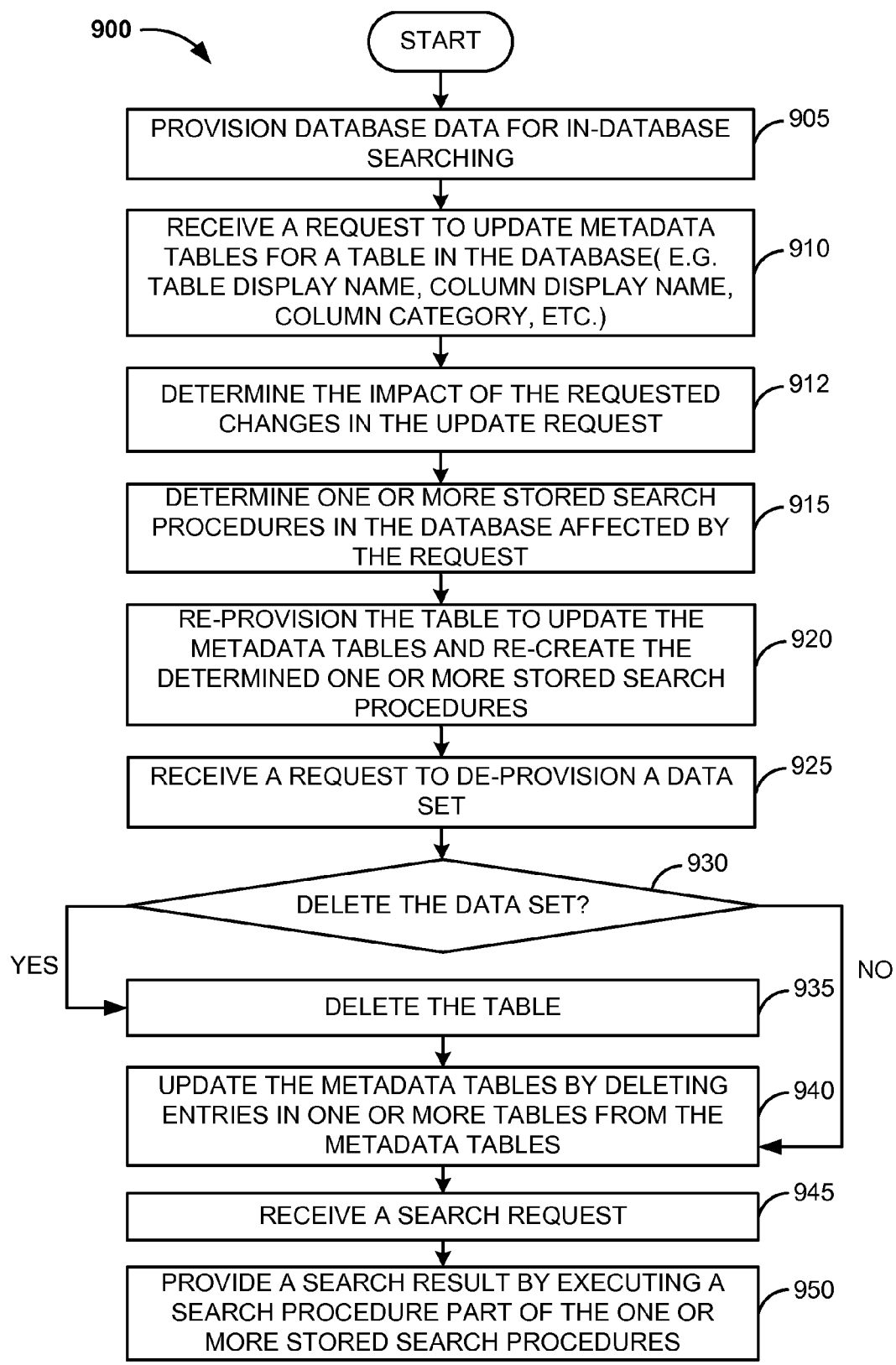
FIG. 9 is a flow diagram illustrating an embodiment of a method for exposing database tables for searching and analysis by utilizing capabilities provided by the database.

FIG. 9 is a flow diagram illustrating an embodiment of a method 900 for exposing database tables for search and analysis by utilizing capabilities provided by the database. At step 905, database data is provisioned for in-database searching. In one embodiment, the provisioning steps performed over the database data may include the steps in method 200 in FIG. 2. Provisioning the database data in a database may result in generating a schema including metadata for the database data. At step 910, a request is received for updating the metadata tables part of the schema. The metadata tables include metadata describing the database data that may be stored in database tables, such as data tables 140 in FIG. 1. The metadata tables may correspond to the metadata tables 160 in FIG. 1. The request to update the metadata may include requests to change table display names, column display names, column data types, column's analysis types, column's categories, the aggregation method for measures, etc. At step 912, the impact of the changes committed by user may be analyzed. An action corresponding to the requested change may be performed. For example, if the analysis type of a column is requested to be changed, then re-provisioning of the metadata stored for the database data may be triggered. In one embodiment, re-provisioning means re-creation of search procedures (e.g. column search procedure) and the impacted info block relevant for the changed column. However, if the user changes the display name of a column/table, then no further actions are required. At step 920, re-provisioning of the metadata tables is performed to update the metadata tables storing metadata for provisioning the database data. Additionally, at step 920, if there are stored search procedures affected by the request, they are also re-created. Table 13 presents pseudo code implementing logic for the process of updating metadata, as described in steps 910 to 920. In another embodiment, the steps for updating metadata may correspond to the process step 450 in FIG. 4. The steps for updating may also be performed by an update module, such as the update module 660 in FIG. 6.

At step 925, a request is received to de-provision a data set part of the database data stored in the database tables. In one embodiment, de-provisioning may be deletion of a data set. In another embodiment, de-provision may be dropping metadata stored for the data set, but retaining the data set for future re-provisioning options. At decision block 930, it is determined whether the request is to delete the data set or to retain the data set but drop the data set metadata. If the request is for deletion of the data set, then at process step 935, the table having the data set is deleted. Then, at process step 940, the metadata tables are updated by deleting all of the relevant entries, in one or more of the metadata tables, corresponding to the deleted data set incorporated in the table. If the request is for retaining the data set, then the method 900 goes to process step 940 and only the metadata tables are updated with the necessary deletion of metadata entries. At step 945, a search requests is received, for example in form of a search query, such as "revenue by country" (described in FIG. 8C). At step 950, a search result corresponding to the search requests is provided. The search result may be provided by executing a search procedure part of the stored searched procedures in the database. In one embodiment, the search procedure may be such as the column search procedure and value search procedures discussed in FIG. 6 and presented in Table 11 and Table 12.

TABLE 13

Pseudo-code

1. User changes the metadata and sends the change request.
2. Application layer checks the changes
   a. If table display name has been changed
      i. Commit the changes.
   b. If column display name has been changed
      i. Commit the changes.
      ii. Now the column name searches will happen on the updated values.
   c. If column data type has been changed
      i. Check if it falls into non searchable datatype(like TEXT)
         1. If yes re-create the value search procedure.
         2. This will make sure the values search will happen only on valid columns.
      ii. Check if it has impact on already saved infoblocks in pr_artifacts table.
         1. If yes
            1. Check if they are still valid
            2. If yes, retain them otherwise delete those
      iii. Commit the changes.artifacts.
   d. If column analysis type has been changed
      i. Re-generate the value search procedure for this artifact.
      ii. Check if it has impact on already saved infoblocks in pr_artifacts table.
         1. If yes
            1. Check if they are still valid
            2. If yes, retain them otherwise delete those artifacts.
      iii. Commit the changes.
   e. If column category is changed
      i. Check if it has impact on hierarchy created.
         1. If yes, re-detect the hierarchy.
      ii. Commit the changes.
   f. If aggregate method for measures is changed
      i. Check if it has impact on already saved infoblocks in pr_artifacts table.
         1. If yes
            1. Check if they are still valid
            2. If yes, retain them otherwise delete those artifacts.
      ii. Commit the changes

TABLE 14

Pseudo-code

1. For each column
   a. If(column id in column_master matches dataset_to_column_mappings)
      i. Delete entries from column master
      ii. Delete entries from dataset_to_column_mappings
      iii. Delete entries from PR_Artifact
      iv. Delete entries from Dataset_master
      v. Delete entries from artifact_to_column_mappings
      vi. Delete entries from Hierarchy table.
      vii. Drop value search procedure
      viii. If( drop table is true And Table is Uploaded by User)
         i. Drop data table
      ix. Else
         i. Do nothing
   b. Else
      i. Do Nothing In one embodiment, the process of provisioning database data (as described in steps 905—915, FIG. 9), the process of re-provisioning (as described in step 920, FIG. 9), the process of de-provisioning (as described in steps 925-940, FIG. 9), and the search process (as described in steps 945-950, FIG. 9) may be performed as separate processes. Different embodiments are not limited to the ordering in FIG. 9.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
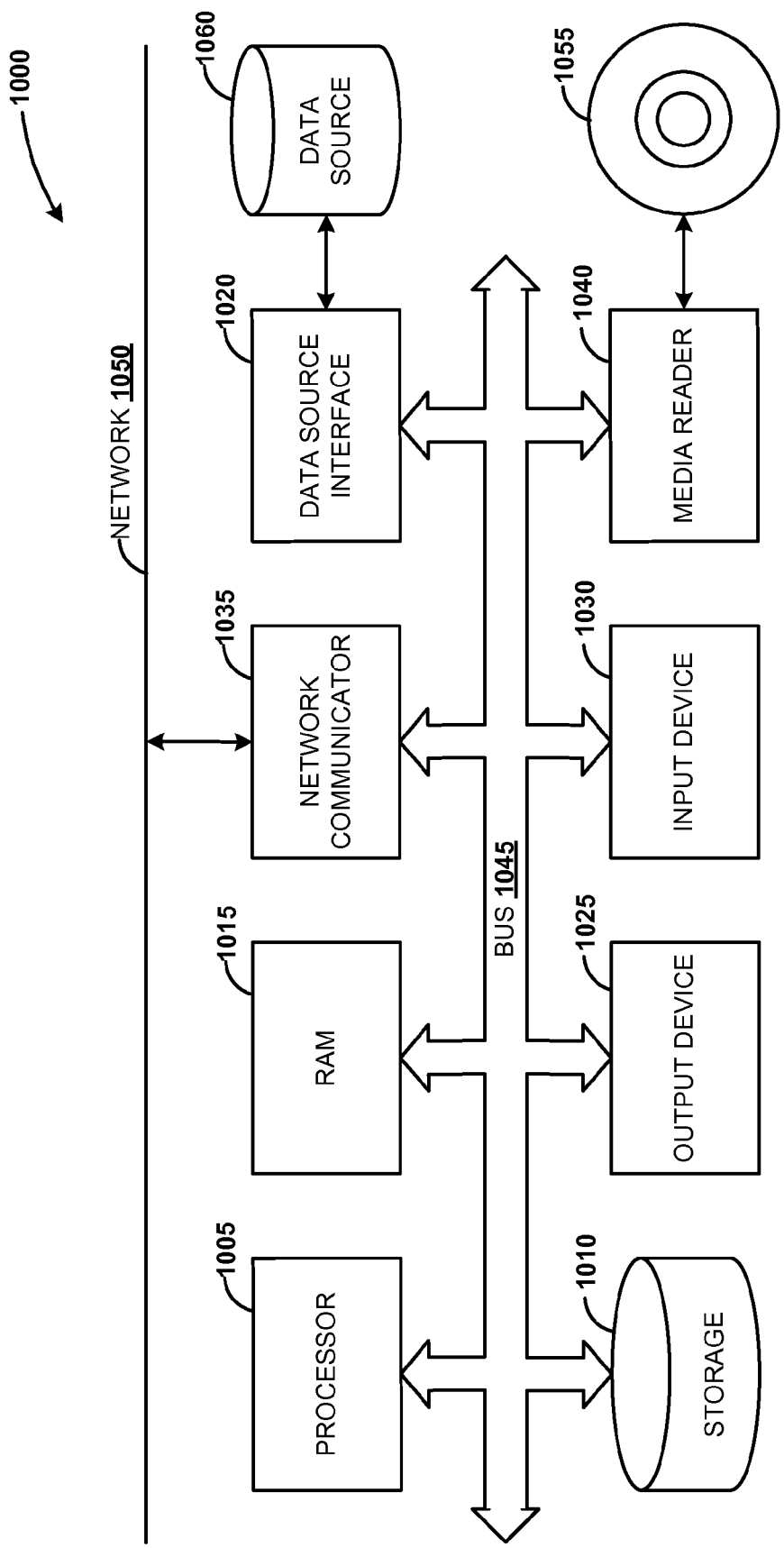
FIG. 10 is a block diagram illustrating an embodiment of a computing system in which the techniques described for provisioning data in a database for in-database searching can be implemented.

FIG. 10 is a block diagram illustrating an embodiment of a computing system 1000 in which the techniques described for provisioning data in a database for in-database searching can be implemented. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for provisioning a data set in a database for in-database searching, the method comprising:
    receiving the data set to be provisioned for in-database searching in the database;
    a processor, analyzing sample data from each column of columns from the data set by executing a metadata evaluation procedure in the database, to detect a plurality of classifications;
    detecting a plurality of classification values for the plurality of classifications of each column of the columns from the data set;
    detecting a hierarchy of a set of classification values for a first classification from the plurality of classifications, defined for a set of columns of the columns from the data set based on determining a correlation between the set of classification values, wherein the set of classification values corresponds to the set of columns for the first classification; and
    storing the detected plurality of classification values for the plurality of classifications of each column of the columns from the data set and the detected hierarchy as data set metadata in a schema comprising metadata for provisioned data in the database, wherein the metadata is used for in-database searching of the database.

2. The method of claim 1, wherein the plurality of classifications of each column of the columns comprise data type, analysis type, aggregation type, formats, and categories, and wherein a classification from the plurality of classifications is associated with a set of predefined classification values.

3. The method of claim 1, wherein the data set is received through a client request to upload the data set to the database.

4. The method of claim 3, wherein the client request to upload the data set further comprises:
    loading the data set into a table in the database;
    evaluating the data set to determine a data type for a column from the table, wherein the data type is a first classification from the plurality of classifications; and
    altering the table to include the determined data type.

5. The method of claim 4, wherein evaluating the data set to determine the data type is performed by a database procedure created in the database.

6. The method of claim 4, wherein determining the data type for the column is based on evaluation of a random selection of sample data from the data set.

7. The method of claim 4, wherein altering the table with the determined data type further comprises:
    altering a first set of columns comprising numeric data to be marked with a numeric data type, wherein the numeric data type is a first classification values for the first classification selected from a group of predefined classification values for the data type; and altering a second set of columns comprising string data to be marked with a variable character field type, wherein the variable character field data type is a second classification values for the first classification selected from the group of predefined classification values for the data type.

8. The method of claim 1, further comprising:
receiving a second request to update metadata of a requested data set; and
updating the metadata by evaluating the second request and an impact of the update on the schema.

9. The method of claim 1, further comprising:
defining a procedure for in-database searching of data according to a search criteria in the database that utilizes the schema comprising the metadata.

10. The method of claim 9, further comprising:
receiving a third party request to do a search on the data in the database; and
providing a search result by utilizing the defined procedure.

11. A computer system for provisioning a data set in a database for in-database searching, the system comprising:
a processor;
a memory in association with the processor storing instructions related to:
a schema design module to:
generate a schema comprising metadata for provisioned data in the database, wherein the metadata is used for in-database searching of the database;
a metadata evaluation module to:
analyze sample data from each column of columns from the data set in the database to be provisioned for in-database searching by utilizing a metadata evaluation procedure executed within the database that detects plurality of classifications of each column of the columns from the data set, wherein the plurality of classifications comprise data type, analysis type, aggregation type, formats, and categories;
detect a plurality of classification values for the plurality of classifications of each column of the columns from the data set; and
detect a hierarchy of a set of classification values for a first classification from the plurality of classifications, defined for a set of columns of the columns from the data set based on determining a correlation between the set of classification values, wherein the set of classification values corresponds to the set of columns for the first classification; and
an update module to:
update the schema with data set metadata comprising the detected plurality of classification values for the plurality of classifications of each column of the columns and the detected hierarchy, wherein the data set metadata is stored when provisioning the data set for in-database searching.

12. The system of claim 11, wherein the memory further stores instructions related to:
a data load module to receive a first request from a client to upload the data set to the database.

13. The system of claim 12, wherein the data load module is further operable to:
load the data set into a table in the database;
evaluate the data set to determine the data type for data values from a column from the table; and
alter the table to include the determined data type.

14. The system of claim 13, wherein evaluating the data set to determine the data type is performed by a database procedure created in the database.

15. The system of claim 11, wherein the memory further stores instructions related to a search module operable to:
store a procedure for in-database searching of data according to a search criteria in the database that utilizes the schema with the metadata;
receive a third party request to do a search on the data in the database; and
provide a search result by utilizing the stored procedure.

16. An article of manufacture for provisioning a data set in a database for in-database searching, comprising a non-transitory computer readable storage medium including executable instructions, which when executed by a computer, cause the computer to perform operations comprising:
generate a schema comprising metadata for provisioned data in the database, wherein the metadata is used for in-database searching of the database;
analyze sample data from each column of columns from the data set from the database to be provisioned for in-database searching by utilizing a metadata evaluation procedure executed within the database that detects a plurality of classifications of each column of the columns from the data set, wherein the plurality of classifications comprise data type, analysis type, aggregation type, formats, and categories;
detect a plurality of classification values for the plurality classifications of each column of the columns from the data set;
detect a hierarchy of a set of classification values for a first classification from the plurality of classifications, defined for a set of columns of the columns from the data set based on determining a correlation between the set of classification values, wherein the set of classification values corresponds to the set of columns for the first classification;
update the schema with data set metadata comprising the detected plurality of classification values for the plurality of classifications of each column of the columns from the data set and the detected hierarchy to provision the data set for in-database searching;
define a procedure for in-database searching data according to a search criteria in the database that utilizes the schema with the metadata;
receive a third party request to do a search on the data in the database; and
provide a search result by utilizing the defined procedure.

17. The computer-readable medium of claim 16, wherein the data set is received from a client request to load the data set in the database.

18. The computer-readable medium of claim 17, wherein the instructions to receive the client request to upload the data set further comprises instructions, which when executed by a computer, cause the computer to:
load the data set into a table in the database;
evaluate the data set to determine the data type for data values from a column from the table; and
alter the table to include the determined data type.

19. The computer-readable medium of claim 18, wherein the instructions to evaluate the data set to determine the data type further comprises instructions, which when executed by a computer, cause the computer to invoke a database procedure created in the database.

20. The computer-readable medium of claim 16, further comprising instructions, which when executed by a computer, cause the computer to:

receive a second request to update metadata of a requested data set; and update the metadata by evaluating the second request and an impact of the update on the schema.

* * * * *